United States Patent Office 3,222,273
Patented Dec. 7, 1965

3,222,273
HYDROGENATION OF MINERAL OILS IN THE PRESENCE OF A MINOR AMOUNT OF A HYDROGENATING CATALYST AND A MAJOR AMOUNT OF A SPECIFIC TYPE OF ACTIVATED ALUMINA
Richard A. Flinn, Penn Hills Township, Allegheny County, William L. Kehl, Indiana Township, Allegheny County, Bruce K. Schmid, McCandless Township, Allegheny County, and Meredith M. Stewart, Penn Hills Township, Allegheny County, Pa., assignors to Gulf Research & Development Company, Pittsburgh, Pa., a corporation of Delaware
No Drawing. Filed June 20, 1961, Ser. No. 118,254
10 Claims. (Cl. 208—112)

This invention relates to the hydrogen treatment of mineral oils and derivatives or fractions thereof and in particular relates to the removal of sulfur and nitrogen compounds therefrom and to the hydrocracking thereof.

It is known that residual and heavy petroleum fractions can be markedly improved by hydrogen treatments of various kinds. It is also known that petroleum and other mineral oils such as shale oil contain sulfur and nitrogen compounds as impurities and that these impurities can be removed by treatment with hydrogen in the presence of hydrogenation catalysts. Although these treatments have resulted in marked enhancement of the properties of the treated hydrocarbon, there is still room for improvement. For instance these procedures have in many cases entailed expensive operating conditions such as unusually high pressures. Furthermore in connection with the purification of residual types of mineral oils or derivatives or fractions thereof, metal impurities have caused rapid deterioration of the activity of the catalyst employed in the process. The deposition of carbonaceous materials on the catalyst surface also has a strong deactivating effect in the hydrogenation of residuals. In all these treatments of petroleum and its fractions a highly active catalyst is desirable.

This invention has for its object to provide improved procedure for the hydrogen treatment of mineral oils and hydrocarbon derivatives and fractions thereof. Another object is to provide improved procedure for the removal or reduction of sulfur and/or nitrogen compounds in mineral oils and hydrocarbon derivatives and fractions thereof. Another object is to provide improved procedure for reducing the sulfur content of mineral oils and derivatives or fractions thereof by catalytic hydrogen treatment. Another object is to provide improved destructive hydrogenation procedure. Other objects will appear hereinafter.

These and other objects are accomplished in accordance with our invention which includes a hydrogen treatment of a mineral oil or hydrocarbon derivative or fraction thereof in the presence of a catalyst composite comprising as a minor component a hydrogenating catalyst and as a major component an activated alumina prepared by drying and calcining a substance which is predominantly composed of an aluminum hydroxide containing from 1.2 to 2.6 mols of water of hydration, said aluminum hydroxide being prepared by precipitation from a solution of an aluminum compound at a pH between 7 and 12.

Any aluminum salt may be employed in preparing the aluminum hydroxide containing 1.2 to 2.6 mols of water of hydration. For instance aluminum nitrate, chloride, acetate, formate, fluoride, sulfate, and other salts of aluminum may be used. Also a variety of bases such as sodium hydroxide, ammonium hydroxide, potassium hydroxide, etc., may be employed to precipitate the aluminum hydroxide. However, we prefer to employ salts of aluminum and bases which do not give reaction byproducts or salts which are difficult to separate from the desired aluminum hydroxide. For instance if aluminum sulfate and/or sodium hydroxide are employed or even if aluminum sulfate and ammonium hydroxide are employed, sulfate salts are formed which are difficult to remove by water washing and usually require prolonged water washing for complete removal. On the other hand if aluminum nitrate, aluminum chloride or an aluminum salt of an organic acid is used and a base such as ammonium hydroxide is employed, the salts which are formed are readily soluble in water and can be easily removed by water washing of the aluminum hydroxide. Such removal may also be accomplished by volatilization during subsequent calcining. For the above reasons potassium and sodium hydroxide are considered to be of little value as compared with aqueous ammonia. Regardless of the specific aluminum salt and base that are used the alumina final product should be substantially free of such salts. Because of ease in removing salts we prefer to use aluminum nitrate or chloride and neutralize with ammonium hydroxide.

The utilization of a pH between 7 and 12 is essential in order to obtain the improved alumina carrier utilized in our invention. In other words the use of a pH above or below this range results in formation of large amounts of undesirable aluminum hydroxides containing higher and/or lower quantities of water of hydration than 1.2 to 2.6 mols per mol of $Al_2O_3$. Also care must be employed at all times during the neutralization to avoid a localized higher or lower pH. If a local pH above or below this value exists at any time a less satisfactory form of aluminum hydroxide having a different water of hydration content will be formed in this local region. This less satisfactory form will dilute the desired form and will reduce its value to a degree greater than to be expected from the amount which is present. For this reason it is desirable to utilize a basic solution having the desired pH between 7 and 12 and to add the aluminum salt in small amounts, preferably an aqueous solution thereof, to the basic solution with rapid agitation. If this expedient is used the resultant aluminum hydroxide is unlikely to be precipitated even in local regions at a pH below 7 or greater than 12. This procedure of course need not be used. For instance slow addition of either reactant to the other with sufficient agitation to prevent local pH values outside the desired range can be used. A pH of 7–8.5 is advantageous since in many cases it gives a higher yield and a purer product. Stoichiometric amounts of the aluminum salt and base are advantageously used. We also prefer to use solutions of both base and aluminum salt which are either dilute or of moderate concentration such as between about one and 20 percent aluminum salt and between about one and 20 percent of basic solution. However higher or lower concentrations can be used. The aluminum hydroxide thus formed is separated from the aqueous mixture by filtration, centrifuging, decanting, or any other suitable method. Washing to remove salts as described above is advantageous and is necessary if the salt is not readily volatilized during the subsequent calcination.

This separated aluminum hydroxide still contains entrained, adherent or mechanically held water and it must be dried to remove this water before a stable product is obtained. Even though the desired form of aluminum hydroxide is initially prepared it is unstable and may undergo transformation during the process of precipitation, separation and/or drying and it is necessary to observe certain precautions to avoid this harmful transformation. Therefore before giving details on the drying and calcining procedure it would be best to consider procedures which may be employed to avoid this harmful transformation, particularly during the process of neutralization and precipitation.

One method for avoiding this harmful transformation is to use elevated temperatures such as above about 170° F. These elevated temperatures reduce or prevent the undesirable transformation of the aluminum hydroxide into one having a lower or higher water of hydration content. However for these temperatures to have these beneficial effects they should be maintained throughout the above mentioned precipitation and washing steps, and until the drying is completed. Higher temperatures such as 200° F. to 300° F. or even higher may be used. This specific mode of preparing aluminum hydroxide of 1.2 to 2.6 mols of water of hydration content is the subject of U.S. application S.N. 118,240, filed June 20, 1961, in the names of W. L. Kehl and M. M. Stewart.

According to another method of avoiding the transformation into less desirable forms the precipitation and drying are carried out with promptness. Thus the time required for the transformation to take place is such that the entire precipitating and drying operations can be carried out even with relatively large or commercial quantities if care is taken to do so expeditiously. Ordinarily formation and drying should take place within a period of at most 24 hours and preferably within about 4 to 8 hours or less when this expedient is used. It is especially advantageous to use a pH of 7–8.5 in connection with this particular method.

The undesirable transformation can be avoided by other methods of preparation. For instance the presence of acetate ion greatly delays the transformation even at ordinary temperatures. Also buffered precipitating solutions may be used. These expedients are the subject matter of applications S.N. 118,279 filed June 20, 1961, and S.N. 118,241, filed June 20, 1961 in the names of W. L. Kehl and M. M. Stewart.

The drying of the aluminum hydroxide may be carried out in any desired manner so long as it is completed prior to the harmful transformation. As may be gathered from the above described procedures for avoiding the transformation, a temperature of above 170° F. will prevent the transformation from taking place. Therefore it is advantageous to employ temperatures at least as high as this for drying. The drying may be carried out in vacuum if desired. It of course follows that considerably higher temperatures than 170° F. may be employed. For instance it is entirely satisfactory to utilize temperatures such as 212° F., 400° F., or even higher. This drying removes the mechanically held water and yields a stable product. Thus this product, once dried, is stable even in the presence of water. It is predominantly composed of the desired aluminum hydroxide containing 1.2 to 2.6 mols of water of hydration.

After drying, the aluminum hydroxide is calcined to obtain an activated alumina which constitutes the carrier for the catalyst employed in our invention. Any conventional method heretofore used for calcining a dried alumina may be employed. However a temperature above about 1600° F. should not be used since such elevated temperatures cause deactivation of the activated alumina. A temperature of between about 800° and 1200° ordinarily is satisfactory. A calcining time of between about 2 and 24 hours ordinarily will be satisfactory. In most cases the shorter time periods will be used with the higher temperatures and the longer periods with the lower temperatures. The final product is opaque, hard and glassy. It has a unique pore structure and is $Al_2O_3$ which still contains a small amount of water— usually less than about 3 percent.

The hydrogenating component of the catalyst may be any metal having a hydrogenating activity such as platinum, palladium, iron, cobalt and/or nickel. The hydrogenating component may also be an oxide or a sulfide or a mixture of an oxide and sulfide of a metal such as vanadium, chromium or molybdenum (metals of Group VI left-hand column of the Periodic System) or of iron, cobalt, nickel, platinum, etc. Examples of highly active hydrogenating catalysts are the free metals first mentioned, molybdenum oxide or sulfide, and mixtures of the Group VI left-hand column metal oxides or sulfides with the oxides or sulfides of nickel, cobalt or iron. These mixtures may in some cases be actual chemical combinations such as cobalt molybdate, nickel molybdate, etc. The hydrogenating component may be deposited upon the activated alumina using any of the many known procedures for impregnating catalyst carriers.

Our invention is applicable to any catalytic hydrogen treatment in which there is an overall consumption of hydrogen. For instance our invention is applicable to hydrodesulfurization, hydrodenitrogenation and destructive hydrogenation or hydrocracking procedures. Our invention is also applicable to procedures wherein the mineral oil, derivative or fraction is treated with hydrogen under conditions which result in saturation of olefins and/or aromatics, the objective being hydrogenation of unsaturated hydrocarbons without necessarily having the concomitant purification such as removal of sulfur.

Hydrodesulfurization and hydrodenitrogenation processes have been applied to a variety of feed stocks and under a variety of reaction conditions and our invention is applicable to all such procedures. For instance our invention may be applied to the hydrodesulfurization and hydrodenitrogenation of residual petroleum fractions such as a reduced or topped crude. These residual fractions are of low value and procedures are known for treating them with hydrogen in the presence of a hydrogenation catalyst deposited upon a carrier such as ordinary activated alumina in order to refine them and thus obtain a higher quality product. These refined products may be used as a fuel oil, as a catalytic cracking stock or for other purposes where an improved higher boiling type of product is desired. These residual fractions frequently contain metal impurities. These impurities are deposited upon the hydrogenation catalysts heretofore used in the prior art. Such deposition necessarily removed a large amount of the metals from the final product; nevertheless the overall effect was commercially unattractive since the activity of the catalyst was reduced by the deposited metalliferous substances. An outstanding advantage of our invention is that these metalliferous substances are not held on the catalyst to a great extent as compared with prior art procedures and these metalliferous materials thus are carried through the hydrogenation reactor and can be removed from the final product by a more economical procedure. Also in many cases the presence of these metal impurities in the final product is of small consequence so that their removal in such an event is not required. Another problem frequently arising in the hydrogenation of residual fractions is the deposition of carbonaceous materials, or "coke," on the catalyst surface. This deposition tends to deactivate the catalyst. Another outstanding advantage of our process is that less coke is deposited on the catalyst. As a result of the reduced tendencies of these catalysts to accumulate deposits of metallic contaminants and carbonaceous material, the "aging" characteristics are much improved. That is, the loss in activity with extended usage is very low. It is also known to remove sulfur and/or nitrogen compounds from distillate stocks such as gasoline, furnace oil, heavy gas oil, or materials boiling above gasoline and employed as satisfactory stocks for charging to a hydrocracking, catalytic cracking or reforming process. Our invention is applicable to these procedures.

As indicated above our invention is also applicable to destructive hydrogenation or hydrocracking procedures. These procedures are commonly applied to middle or heavy distillates in order to obtain an improved lower boiling product by simultaneous cracking and hydrogenation. These procedures also frequently result in simultaneous desulfurization and/or denitrogenation. The feed stocks mentioned above in connection with the hydrodesulfurization and hydrodenitrogenation could be the same or very similar to those used in destructive hydrogenation. On the other hand, it is frequently desirable to hydrodesulfurize or hydrodenitrogenate the feed stocks to be charged to a hydrocracking reactor. The ability of these aluminas to form active hydrocracking catalysts is somewhat unexpected, since conventional alumina-supported hydrogenation catalysts do not normally hydrocrack at moderate temperatures and pressures. When used in hydrocracking processes it is preferable to use a promoter, such as fluorine or silica, in combination with any of the previously mentioned catalyst components.

It is also customary to carry out the hydrodesulfurization or hydrodenitrogenation of distillate fractions of mineral oils such as straight run gasoline, gasoline produced by thermal or catalytic cracking, naphtha, furnace oil, heavy gas oil, a feed to a hydrocracking or reforming operation, etc. In these and similar procedures the objective usually is purification without formation of lower boiling materials. Our invention is applicable to such procedures.

The reaction conditions for these hydrogen treatments in general will be the same as used in the same procedures of the prior art. However because of the high activity of our catalyst it is frequently possible to use lower pressures than have been used previously. These hydrodesulfurization, hydrodenitrogenation, destructive hydrogenation, hydrocracking or hydrogenating procedures are carried out at pressures above about 200 p.s.i.g. For the hydrogen treatment of residual stocks, pressures of between about 500 and 4000 p.s.i. will generally be used although much higher pressures can be employed and may be advantageous in certain cases. Distillates may be treated satisfactorily at about 500 to 2000 p.s.i. in most cases. Temperatures of between about 400° and 900° F. ordinarily will be employed in these hydrogen treatments. The specific temperature will depend upon the feed stock and the objective. For instance in hydrocracking it is frequently necessary to use high temperatures if thorough nitrogen removal has not been achieved previously on the feed stock and temperatures in the upper portion of the above range therefore will be used on certain occasions. Other than for such hydrocracking, distillate feed stocks ordinarily will be treated at temperatures of between about 500° and 800° F. Residual stocks usually involve treatments between about 700° and 825° F. The hydrogen recycle rate ordinarily will be between about 1000 and 20,000 standard cubic feet per barrel of feed stock and preferably between about 2000 and 10,000 standard cubic feet per barrel of feed stock. Space velocities of between about 0.2 and 10 and especially between about 0.5 and 5 ordinarily will be used.

The following example illustrates one satisfactory method for preparing a specific catalyst and its utilization for the hydrodesulfurization of a petroleum residue in accordance with our invention.

Example I

An activated alumina carrier was prepared by dissolving 4730 grams $AlCl_3 \cdot 6H_2O$ in 20 liters of water and adding 500 grams of glacial acetic acid to form a first solution. A second solution was prepared by mixing two volumes of concentrated $NH_4OH$ with five volumes of water. These solutions were mixed with rapid agitation. The pH of the resultant slurry was 8. Fifteen and one-half liters of the aqueous ammonia solution were employed. The precipitate which resulted was separated by filtration, and the cake was washed with water containing one gram of ammonium acetate per liter and dried at 250° F. The time elapsing between addition of ammonia and completion of drying was 139 hours. This dried material was broken and sieved to recover the 10–20 mesh class. It contained approximately 1.7 mols of water of hydration. It was brought to a temperature of 1000° F. over a period of six hours and calcined for 10 hours at that temperature. After cooling, 380.3 grams of the calcined material were treated by the incipient wetness technique with a solution made by dissolving 64.8 grams of ammonium paramolybdate in 28.3 cc. of concentrated aqueous ammonia and diluting the solution to 256 cc. with distilled water (the molybdenum content of this solution on $MoO_3$ basis was 17.2 percent). The net weight of the resulting material was 681.8 grams. The estimated metal pick-up was 8.13 percent Mo or 12.21 percent $MoO_3$. The impregnated material was dried for 21 hours at 250° F. with stirring; it weighed 467.8 grams. It was treated by the incipient wetness technique with 175 cc. of an aqueous solution containing 1.54 percent nickel (determined as NiO), and 3.07 percent cobalt (determined as CoO). This latter solution was made by dissolving 14.07 grams of $Ni(NO_3)_2 \cdot 6H_2O$ and 21.85 grams of $Co(NO_3)_2 \cdot 6H_2O$ crystals in water and diluting to 175 cc. The impregnated material had a net weight of 649.1 grams and estimated nickel, cobalt, and molybdenum deposits of 0.50 percent, 1.00 percent and 8.00 percent respectively. The material was oven-dried for 25 hours at 250° F. and calcined at 900° F. for 10 hours after being brought to that temperature over a period of 6 hours. Its density was 0.916 g./cc., its surface area 237 m.²/g., its average pore radius 57A, and its pore volume 0.337 liquid cc./gram.

For comparative purposes two other catalysts having practically the same nickel, cobalt and molybdenum contents were tested. One of these catalysts was a commercial gamma alumina widely used as a catalyst carrier. The other carrier was a commercial Eta alumina carrier.

These three catalysts were then employed in the hydrogen treatment of a Kuwait vacuum residue having the properties given in the first column of Table I at 750° F., 1000 p.s.i.g., 0.5 space velocity (liquid volumes of feed per volume of catalyst per hour) with a hydrogen recycle rate of 10,000 standard cubic feet per barrel. The results are given in Table I.

TABLE I

| Catalyst Support | Charge | Alumina Prepared in Accordance With Present Invention | Commercial Gamma Alumina | Commercial Eta Alumina |
|---|---|---|---|---|
| Product Inspections: | | | | |
| Gravity: °API | 5.5 | 19.1 | 17.9 | 16.5 |
| Sulfur: Percent | 5.45 | 0.63 | 0.86 | 1.20 |
| Carbon Residue: Percent | 23.1 | 8.4 | 9.4 | 10.5 |
| Vanadium: p.p.m | 102 | 25 | 3.6 | 6.9 |
| Nickel: p.p.m | 32 | 12 | 4.5 | 12.4 |
| Nitrogen: Percent | 0.43 | 0.27 | 0.32 | 0.37 |
| Carbon Deposit: | | | | |
| Percent by wt. of Catalyst | | 8.4 | 17.1 | 18.7 |
| Grams/100 cc. Catalyst | | 7.7 | 12.1 | 15.5 |

From the data in Table I it will be evident that the invention gives unusual results. Thus the gravity of the product obtained in accordance with the present invention was considerably higher than obtained with either of the other alumina carriers which exemplify the carriers of the prior art. This indicates a considerably higher degree of hydrocracking activity. It will also be noticed that the degree of desulfurization and nitrogen removal was vastly superior to either of the other prior art procedures. This is of real importance from a commercial standpoint. The relatively thorough removal of nitrogen compounds at a moderate pressure of 1000 p.s.i.g. is a result of significance since such compounds are difficult to remove and usually require much higher pressures such as 3000 p.s.i.g. A difference of great significance is the fact that the metal impurities contained in the feed stock are not retained on the catalyst of our invention to nearly as high an extent as in the prior art, but remain to an appreciable degree in the product. This will result in a much longer lived catalyst. The much lower weight of coke deposit on the catalyst with the instant invention is also of importance. This will enable a much higher throughput with hydrogen treatment procedures. This is of major economic importance since the operations involved in depressuring high pressure equipment, regenerating and repressuring consumes time and requires added expensive equipment. These additional costs will be considerably reduced by the present invention.

*Example II*

Two of the catalysts described in the preceding example (the catalyst of this invention and the catalyst supported on commercial gamma alumina) were employed in a high throughput hydrogen treatment of a Kuwait vacuum residue having the properties given in Example I at 750° F., 1000 p.s.i.g., 0.5 space velocity with a hydrogen rate of 10,000 standard cubic feet per barrel. The sulfur content of the liquid products at intervals throughout the run are given in Table II.

It is evident from the data in Table II that the procedure of our invention not only results in high initial activity or sulfur removal, but the rate of deactivation of the catalyst in our process in substantially less. For example, the calculated rate of deactivation of the catalyst in the process of our invention is only about 0.15 percent sulfur per 100 hours, compared to about 1 percent sulfur per 100 hours for the commercial catalyst. In addition, the carbon deposit on the catalyst at the end of 96 hours onstream was only 12.5 percent for the present invention, compared to 18 percent when the commercial gamma alumina catalyst is used.

TABLE II

| Catalyst Support | Alumina Prepared In Accordance With Present Invention | Catalyst on Commercial Gamma Alumina |
| --- | --- | --- |
| Sulfur Content of Product: Percent by Wt.: | | |
| At 20 hrs | .87 | 1.3 |
| At 40 hrs | .90 | 1.5 |
| At 60 hrs | .93 | 1.7 |
| At 80 hrs | .96 | 1.9 |

*Example III*

The three catalysts having supports as described, but containing about 0.3 percent Ni, 2 percent Co, and 10 percent Mo, were employed for the hydrodenitrogenation of an FCC furnace oil distillate containing 340 parts per million nitrogen and 2.0 percent sulfur. These runs were all carried out at 1000 p.s.i.g., 650° F. and 2 space velocity. The results are given in Table III.

TABLE III

| Catalyst Support | Nitrogen in Product: p.p.m. | Sulfur in Product: p.p.m. |
| --- | --- | --- |
| Commercial Gamma Alumina | 60 | 0.10 |
| Eta Alumina | 25 | 0.047 |
| Alumina of Present Invention | 5 | 0.032 |

From the data in Table III it will be evident that the present invention gives vastly superior results for nitrogen removal as compared with the other catalysts representative of the prior art. It will also be noted that superior desulfurization was obtained.

*Example IV*

Two of the catalysts described in Example III (the alumina support of this invention and the catalyst supported on commercial gamma alumina) were employed for the hydrodesulfurization of an FCC furnace oil distillate containing 340 parts per million nitrogen and 2.0 percent sulfur. Then runs were carried out at 600 p.s.i.g., 650° F., and 2 space velocity. The results are given in Table IV.

TABLE IV

| Catalyst Support | Sulfur in Product, percent by wt. | Nitrogen in Product, p.p.m. |
| --- | --- | --- |
| Commercial Gamma Alumina | 0.21 | 160 |
| Alumina of Present Invention | 0.065 | 120 |

From the data of Table IV it is evident that the present invention gives substantially better desulfurization, as well as better nitrogen removal, than is obtained using a standard alumina catalyst support.

What we claim is:

1. The process for hydrogen treatment with an over-all consumption of hydrogen of a hydrocarbon selected from the group consisting of mineral oil, hydrocarbon fractions thereof, and hydrocarbon derivatives thereof, which comprises contacting said hydrocarbon with hydrogen under hydrogenation conditions of temperature and pressure in the presence of a catalyst comprising essentially a minor amount of a hydrogenating catalyst composited with a major amount of an activated alumina prepared by drying and calcining a substance which is predominantly composed of an aluminum hydroxide containing from 1.2 to 2.6 mols of water of hydration, said aluminum hydroxide being prepared by precipitation from a solution of an aluminum compound at a pH between 7 and 12, and drying to the above specified water of hydration content prior to substantial transformation to an aluminum hydroxide having a higher or lower water of hydration content.

2. The process for hydrogen treatment with an over-all consumption of hydrogen of a hydrocarbon which contains harmful amounts of sulfur compounds and which is selected from the group consisting of mineral oil, hydrocarbon fractions, and hydrocarbon derivatives thereof, which comprises contacting said hydrocarbon with hydrogen under hydrodesulfurization conditions of temperature and pressure in the presence of a catalyst comprising essentially a minor amount of a hydrogenating catalyst composited with a major amount of an activated alumina prepared by drying and calcining a substance which is predominantly composed of an aluminum hydroxide containing from 1.2 to 2.6 mols of water of hydration, said aluminum hydroxide being prepared by precipitation from a solution of an aluminum salt selected from the group consisting of aluminum chloride and aluminum nitrate by neutralization with ammonium hydroxide while maintaining a pH between 7 and 8.5 and drying to the above specified water of hydration content prior to substantial transformation to an aluminum hydroxide having a higher or lower water of hydration content.

3. The process for hydrogen treatment with an over-all consumption of hydrogen of a hydrocarbon which contains harmful amounts of nitrogen compounds and which is selected from the group consisting of mineral oil, hydrocarbon fractions of mineral oil, and hydrocarbon derivatives of mineral oil, which comprises contacting said hydrocarbon with hydrogen under hydrodenitrogenation conditions of temperature and pressure in the presence of a catalyst comprising essentially a minor amount of a hydrogenating catalyst composited with a major amount of an activated alumina prepared by drying and calcining a substance which is predominantly composed of an aluminum hydroxide containing from 1.2 to 2.6 mols of water of hydration, said aluminum hydroxide being prepared by precipitation from a solution of an aluminum salt at a pH between 7 and 12 and drying to the above specified water of hydration content prior to substantial transformation to an aluminum hydroxide having a higher or lower water of hydration content.

4. The process for destructive hydrogenation with an over-all consumption of hydrogen of a residual fraction of petroleum, which comprises contacting said fraction with hydrogen under destructive hydrogenation conditions of temperature and pressure in the presence of a catalyst comprising essentially a minor amount of a hydrogenating catalyst composited with a major amount of an activated alumina prepared by drying and calcining a substance which is predominantly composed of an aluminum hydroxide containing from 1.2 to 2.6 mols of water of hydration, said aluminum hydroxide being prepared by precipitation from a solution of an aluminum salt at a pH between 7 and 12 and drying to the above specified water of hydration content prior to substantial transformation to an aluminum hydroxide having a higher or lower water of hydration content.

5. The process for hydrogen treatment with an over-all consumption of hydrogen of a hydrocarbon selected from the group consisting of mineral oil, hydrocarbon fractions, and hydrocarbon derivatives thereof, which comprises contacting said hydrocarbon with hydrogen under hydrogenation conditions of temperature and pressure in the presence of a catalyst comprising essentially a minor amount of a hydrogenating catalyst composited with a major amount of an activated alumina prepared by drying at a temperature above about 170° F. and calcining at a temperature of between about 800° and 1200° F. a substance which is predominantly composed of an aluminum hydroxide containing from 1.2 to 2.6 mols of water of hydration, said aluminum hydroxide being prepared by precipitation from a solution of an aluminum compound at a pH between 7 and 12.

6. The process for hydrogen treatment with an over-all consumption of hydrogen of a hydrocarbon selected from the group consisting of mineral oil, hydrocarbon fractions, and hydrocarbon derivatives thereof, which comprises contacting said hydrocarbon with hydrogen under hydrogenation conditions of temperature and pressure in the presence of a catalyst comprising essentially a minor amount of a hydrogenating catalyst composited with a major amount of an activated alumina prepared by drying and calcining a substance which is predominantly composed of an aluminum hydroxide containing from 1.2 to 2.6 mols of water of hydration, said aluminum hydroxide being prepared by precipitation from a solution of an aluminum compound at a pH between 7 and 12 at a temperature between about room temperature and 212° F. and drying to the above specified water of hydration content prior to substantial transformation to an aluminum hydroxide having a higher or lower water of hydration content.

7. The process for hydrogen treatment with an over-all consumption of hydrogen of a residual petroleum fraction which contains a substantial amount of metalliferous impurities which comprises contacting said residual petroleum fraction with hydrogen at elevated temperature and pressure in the presence of a hydrogenation catalyst comprising essentially a minor amount of a member of the group consisting of oxides and sulfides of metals of Group VI left-hand column of the Periodic System and of iron group metals composited with a major amount of an activated alumina prepared by drying and calcining a substance which is predominantly composed of an aluminum hydroxide containing from 1.2 to 2.6 mols of water of hydration, said aluminum hydroxide being prepared by precipitation from a solution of an aluminum salt at a pH between 7 and 12 and being dried prior to substantial alteration of the water of hydration content.

8. The process for the hydrodesulfurization with an over-all consumption of hydrogen of a residual petroleum fraction which comprises contacting said residual fraction with hydrogen under hydrogenation conditions of temperature and pressure in the presence of a catalyst comprising essentially a minor amount of a hydrogenating catalyst composited with a major amount of an activated alumina prepared by drying and calcining a substance which is predominantly composed of an aluminum hydroxide containing from 1.2 to 2.6 mols of water of hydration, said aluminum hydroxide being prepared by precipitation from a solution of an aluminum compound at a pH between 7 and 12 and drying to the above specified water of hydration content prior to substantial transformation to an aluminum hydroxide having a higher or lower water of hydration content.

9. The process for the hydrodesulfurization with an over-all consumption of hydrogen of a residual petroleum fraction which comprises contacting said residual fraction with hydrogen under hydrogenation conditions of temperature and pressure in the presence of a catalyst comprising essentially a minor amount of a hydrogenating catalyst composited with a major amount of an activated alumina prepared by drying and calcining a substance which is predominantly composed of an aluminum hydroxide containing from 1.2 to 2.6 mols of water of hydration, said aluminum hydroxide being prepared by precipitation from a solution of an aluminum compound at a pH between 7 and 8.5 and drying to the above specified water of hydration content prior to substantial transformation to an aluminum hydroxide having a higher or lower water of hydration content.

10. The process for hydrodesulfurization with an over-all consumption of hydrogen of a residual pertoleum fraction which comprises contacting the residual petroleum fraction with hydrogen at a pressure between about 500 and 4000 p.s.i., at a temperature between about 700° and 825° F., at a space velocity between about 0.5 and 5 volumes of residual petroleum feed stock per volume of catalyst per hour, with a hydrogen recycle rate of between about 2000 and 10,000 standard cubic feet per barrel of residual feed in the presence of a catalyst comprising essentially a minor amount of a member of the group consisting of oxides and sulfides of metals of Group VI left-hand column of the Periodic System and of iron group metals composited with a major amount of an activated alumina prepared by drying and calcining a substance which is predominantly composed of an aluminum hydroxide containing from 1.2 to 2.6 mols of water of hydration, said aluminum hydroxide being prepared by precipitation from an aqueous solution of a member of the group consisting of aluminum nitrate and aluminum halide at a pH between 7 and 8.5 using ammonium hydroxide and being dried prior to substantial alteration of the water of hydration content.

References Cited by the Examiner
UNITED STATES PATENTS

| | | | |
|---|---|---|---|
| 1,929,942 | 10/1933 | Borclay | 23—143 |
| 1,953,201 | 4/1934 | Tosterud | 23—143 |
| 2,934,492 | 4/1960 | Hemminger et al. | 208—112 |
| 2,935,545 | 5/1960 | Block | 260—683.66 |
| 2,946,738 | 7/1960 | Gardner et al. | 208—112 |

ALPHONSO D. SULLIVAN, *Primary Examiner.*